May 16, 1939.                E. F. TETZLAFF                2,158,208
                ATTACHMENT FOR MOTION PICTURE MACHINES
                        Filed Oct. 23, 1937
FIG. 1
FIG. 2
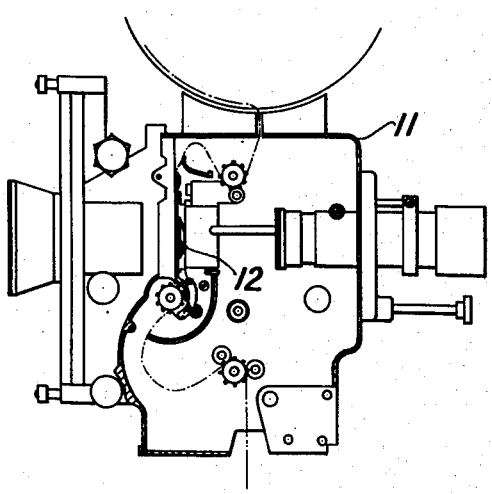
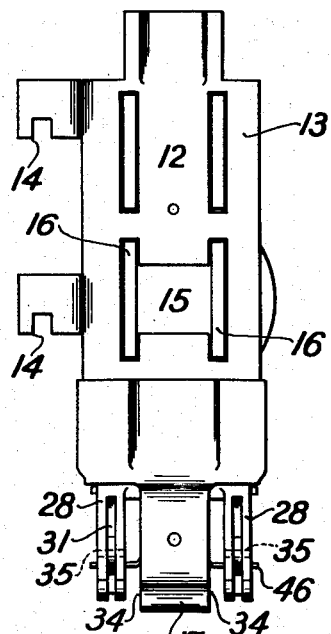
FIG. 3
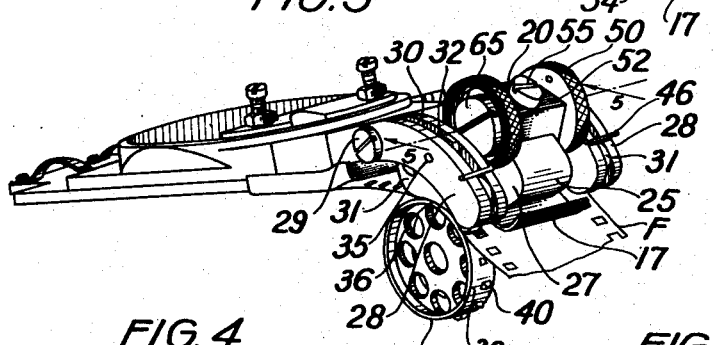
FIG. 4
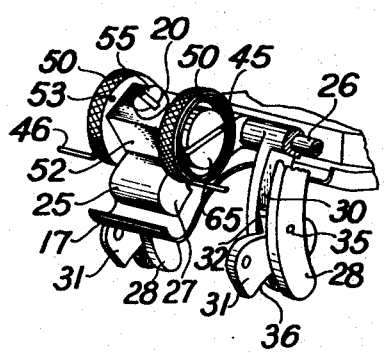
FIG. 5
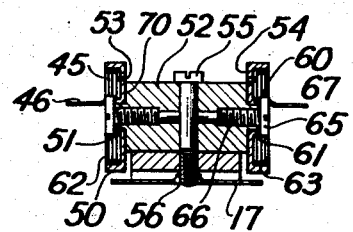
Edwin F. Tetzlaff
INVENTOR
BY
ATTORNEYS Patented May 16, 1939

2,158,208

UNITED STATES PATENT OFFICE 2,158,208

ATTACHMENT FOR MOTION PICTURE MACHINES

Edwin F. Tetzlaff, Rochester, N. Y., assignor to Eastman Kodak Company, Rochester, N. Y., a corporation of New Jersey Application October 23, 1937, Serial No. 170,609

9 Claims. (Cl. 88—17)

The present invention relates to improvements to attachments for machines through which films are to be passed, especially for motion picture purposes, and more particularly to a modification of a film trap gate in the intermittent film guide assembly of a motion picture projector, although it is to be understood that it is applicable to machines for other purposes.

One object of the invention is the provision in an intermediate film guide assembly of an arrangement for insuring the seating of both the film shoes against the film strip to securely hold the latter against the face of the intermittent sprocket.

Another object of the invention is the provision of such an arrangement which insures the riding of the film strip on the face of the sprocket irrespective of the alignment thereof.

A further object of the invention is the provision of an independent floating guide on each side of the film strip to positively hold the latter against the face of the sprocket.

A still further object is the provision of such a floating guide arrangement which is simple in construction, removable from or attachable, as a unit, to the film guide trap, relatively inexpensive to manufacture, and highly effective to use.

To these and other ends, the invention resides in certain combinations and improvements of parts all as will be hereinafter more fully described, the novel features being pointed out in the claims at the end of the specification.

In the drawing:

Fig. 1 is a vertical sectional view through a motion picture projector, showing the relation of the film trap gate thereto;

Fig. 2 is an elevation view of a film trap gate, showing an intermittent film guide assembly constructed in accordance with the preferred embodiment of the invention;

Fig. 3 is a perspective view of the film trap gate illustrated in Fig. 2, showing the relation of the various parts of the intermittent film guide assembly constructed in accordance with the present invention;

Fig. 4 is a view similar to Fig. 3, taken from the opposite side of the gate, showing the parts in a slightly different position; and Fig. 5 is a vertical sectional view through the intermittent film guide assembly taken substantially on the line 5—5 of Fig. 3, the floating guides being omitted, showing the method of independently adjusting the tension of the two coil springs.

Similar reference numerals throughout the various views indicate the same parts.

The present invention relates to an improved type of intermittent film guide assembly for motion picture projectors. In the present form of guides, the film strip is supported on the outside edges adjacent the marginal perforations. Such arrangements do not allow sufficient freedom to insure the seating of both of the film shoes against the film strip. In addition, the film strip may or may not ride on the face of the intermittent sprocket at various times during its projection, depending upon the pressure applied to the shoes and/or the alignment of the assembly. When the film strip is in contact with the tapered face of the sprocket tooth at a point somewhat removed from the base of the sprocket, the bearing area is decreased and the unit pressure therefore becomes excessive. Furthermore, the shape of the film strip in the region near the point of contact with the tooth is distorted due to the lack of the supporting cylindrical surface of the sprocket, and a resulting tearing effect is introduced. In consequence of these two effects, excessive wear occurs on the edge of the perforations. Eventually, damage to the film occurs and prevents its further use.

In order to overcome these difficulties, the present invention provides an arrangement in which floating guides or arms engage each side of the film strip and hold the latter against the base of the sprocket tooth. This arrangement comprises, in general, an intermittent film guide assembly which is detachably secured to the depending apron on the film trap gate. This assembly provides a supporting member on which is mounted two floating forked or bifurcated guide members or arms which are arranged to independently swing in parallel planes about an axis near one end of each member. Each of the forked guide members carries a pivoted film pressure shoe which engages an edge of the film strip to hold the latter against the cylindrical surface of the sprocket outside of the sprocket teeth. Coil springs on the supporting member act independently on the two forked members, and press these members, and hence the shoes which they carry, toward the film strip so as to maintain the latter in full engagement with the surface of the sprocket and at the base of the sprocket teeth. Means is provided for separately tensioning each spring. It is thus apparent that each shoe has two degrees of freedom. First, it is free to move about its axis on the forked member. Second, its axis may be moved, by moving the forked member, toward or away from the intermittent sprocket.

These degrees of freedom thus provide for a sustained pressure on both edges of the film strip against the base of the sprocket when a film splice passes the intermittent sprocket; or when the main supporting member or apron is improperly aligned with relation to the intermittent sprocket; or when the main supporting member, which may be moved away from the sprocket during threading and which is sometimes moved slightly away due to the passing of a film splice, does not fully return to its normal position.

Referring now to the drawing, and particularly to Fig. 1, there is shown a motion picture projector 11 in which is mounted film trap gate 12 constructed in accordance with the present invention, and hereinafter more fully described. As the projector itself may be of any suitable construction and does not constitute a part of the present invention, a detailed description thereof is not deemed necessary to those in the art.

The film trap gate 12 is of the shape best shown in Fig. 2, and comprises a plate-like body 13 which is adapted to be positioned adjacent the conventional aperture plate in the motion picture projector by means of the lugs 14, in the usual and well-known manner. The body 13 is formed with a rectangular shaped opening 15 through which light rays from the lamp, not shown, are adapted to pass. In order to properly position the film strip F against the aperture plate, the film trap gate 13 is provided with the usual spring press film engaging member 16. The lower end of the gate 13 is formed with a curved depending apron 17, of the shape best shown in Figs. 3 and 4.

An intermittent film guide assembly, generally indicated by the numeral 20, is detachably secured to the apron 17 in a manner hereinafter described. This assembly comprises a curved supporting member 25 which overlies the rear face of the apron 17, as clearly illustrated in Figs. 3 and 4. One end of this supporting member has a shaft 26 which extends therethrough and projects laterally from the opposite sides 27 thereof to support a pair of spaced curved forked or bifurcated members or arms 28, of the shape best shown in Fig. 4. These forked members are loosely or pivotally mounted on the shaft 26, and are held in position thereon by means of screws 29 which engage threaded openings in the ends of the shaft 26.

Referring now to Fig. 4, it is apparent that the forked arms or guides 28 are free to swing about the shaft 26 in substantially parallel planes. In order to insure further freedom for such movement, the sides of the apron are cut away, as shown at 34 in Figs. 2 and 4. Each of these arms is arcuated in shape, as shown in Fig. 4, and is formed with a longitudinal open end slot 30 in which a thin film pressure shoe 31 is positioned. Each shoe is provided with a lug 32 through which a pin 35 extends to pivot the shoe 31 at or near its mid point to the arm 28. The exposed side of the shoe 31 is formed with a curved surface of face 36 formed substantially concentric with the axis of the intermittent sprocket 37, and adapted to engage the film strip F to hold the latter in engagement with the cylindrical face 39 of the sprocket, as best shown in Fig. 3.

By means of the above arrangement, the film pressure shoes 31 are thus provided with two degrees of freedom. They are free to rotate about their pivot pins 35, and they are also movable about the axis 26 due to their connection to the arms 28. These degrees of freedom thus insure constant engagement of the pressure shoes 31 with the opposite edges of the film strip F to hold the latter against the face 39 of the sprocket, and at the base of the sprocket teeth 40, the advantages of which will be apparent to those in the art. These degrees of freedom will also automatically compensate for any slight wear on the lugs 14, and their cooperating pins, or any slight misalignment or cocking of the sprocket 37, or any bending or distortion of the apron 17.

Each of the shoes 31 are separately and independently pressed toward the intermittent sprocket 37 by means of a coil spring 45, the free end 46 of which engages the back of the forked arm or guide 28, as clearly illustrated in Fig. 3. The coil springs 45 are mounted in knurled cup-shaped members or drums 50 which are loosely mounted, as later described, on reduced bearing portions 51 formed on opposite ends of a block 52 secured to the back of the supporting member 25. The opposite end 53 of each spring 45 is anchored to the bottom 54 of the drum 50, in any suitable well-known manner. The supporting member 25 may be provided with a shallow notch or recess, not shown, in which the block 52 may be positioned. A screw 55 extends through the block 52 and the supporting member 25, and into a registering aperture 56 in the apron 17 to detachably secure the entire assembly as a unit to the apron.

Referring now to Fig. 5, each cup-shaped member or drum 50 is provided with an inwardly extending central sleeve portion or boss 60 for rotatably mounting the drum on the bearing 51. The central opening 61 in the sleeve 60 is of slightly larger diameter than the bearing 51 so that the drum may be moved or rotated thereon for a purpose to be presently described. An annular groove 62 is formed between the sleeve 60 and the inner surface 63 of the drum to receive the convolutions of the coil spring 45, as clearly shown in Fig. 5. As one end 46 of each spring 45 engages one of the arms 28 and the other end 53 is anchored to the bottom 54 of the drum, it is apparent that by gripping the knurled periphery of the drum and rotating the latter, the spring 45 may be wound or released to vary the tension thereof. After the spring 45 has been thus tensioned, it is held in locked or adjusted position by reason of the engagement of the head 65 of a screw 66 with the surface 67 of the sleeve 60, to clamp the drum 50 between the head 65 and the face 70 of the block 52, as best shown in Fig. 5. The shank of the screw 66 engages a threaded opening formed in the bearing 50. When the spring 45 is to be adjusted, the screw 66 is backed off, and the drum 50 is then rotated in the proper direction until the desired adjustment is secured. The screw 66 is then moved inwardly to clamp or lock the drum against further movement.

By means of the separate springs 45, the arms 28, and their shoes 31, may be independently and yieldably moved toward the sprocket 37. Obviously, any tendency of the shoes 31 to move upwardly, as viewed in Fig. 3, is resisted by the springs 45, thus insuring that the shoes will always be maintained in contact with the film strip. Furthermore, as the tension of each spring 45 may be separately and independently adjusted, as above described, sufficient force may be applied to each shoe to hold the opposite edges of the film strip against the cylindrical surface 39 of the sprocket 37.

While the above description relates to a guide such as would be used on motion picture projection of 35 mm. film, it is contemplated that such a construction is also adapted for use on projectors for films of different sizes. The advantage of such a structure consists of a uniform positioning of both edges of the film against the base of the intermittent sprocket, resulting in a much longer life for the film. Furthermore, the film at failure shows more nearly uniform wear along both edges.

It is thus apparent from the above description that the present invention provides an arrangement in which the film shoes have two degrees of freedom thus assuring that the shoes will always be maintained in engagement with the film strip. Each shoe is independently movable in a substantially parallel plane so as to automatically compensate for any slight misalignment of the sprocket, or changes in the position of the film trap gate due to wear of the lugs 14 or its cooperating pins, or for slight bending or distorting of the apron 17, thus assuring that both edges of the film strip will be held in engagement with the cylindrical face of the sprocket and at the bottom of the sprocket teeth, the advantages of which will be apparent to those in the art.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention and the scope of the appended claims.

I claim:

1. In a machine of the class described, an intermittent film guide assembly comprising, in combination, a support, a guide having one end thereof pivotally mounted on said support, a film shoe pivotally mounted directly on said guide intermediate the ends thereof and adapted to freely move relative thereto, means engaging the other end of said guide and tending to yieldably move the latter and said shoe toward a film sprocket, and means for adjusting said last mentioned means.

2. In a machine of the class described, the combination with an apertured body, of an intermittent film guide assembly comprising a supporting member, a pair of guides arranged on opposite sides of said member and separately and independently pivotally mounted thereon, film pressure shoes pivotally mounted on said guides, resilient means engaging said guides to move the latter and said shoes toward a film sprocket to securely hold a film strip thereagainst, means for tensioning said resilient means, and means for detachably mounting said guide assembly as a unit on said body.

3. In a motion picture machine, an intermittent film guide assembly comprising, in combination, a supporting member, a pair of guides arranged on opposite sides of said member and independently rockably mounted thereon, film pressure shoes pivotally mounted on said guides, resilient means engaging said guides to separately move the latter and said shoes toward a film sprocket to securely hold a film strip thereagainst, means for tensioning said resilient means, and means for locking said last mentioned means in adjusted position.

4. In a motion picture machine, an intermittent film guide assembly comprising, in combination a supporting member, a pair of guides arranged on opposite sides of said member and pivotally mounted thereon, said guides being independently movable relative to said member, a film pressure shoe pivotally mounted on each of said guides, separate springs on said member arranged to engage said guides to yieldably move the latter and said shoes toward a film sprocket, means for independently adjusting said springs, and means for independently locking said springs in adjusted position.

5. In a motion picture machine, the combination with an apertured body, of an intermittent film guide assembly comprising a supporting member, a pair of guides arranged on opposite sides of said member and rockably mounted thereon, said guides being independently movable relative to said member, a film pressure shoe pivotally mounted on each of said guides, separate springs on said member arranged to engage said guides to yieldably move the latter and said shoes toward a film sprocket, means for independently adjusting said springs, means for independently locking said springs in adjusted position, and means for detachably securing said assembly as a unit to said body.

6. In a motion picture machine, an intermittent film guide assembly comprising, in combination a supporting member, a shaft secured to said supporting member and projecting laterally from opposite sides thereof, a pair of forked guides arranged on opposite sides of said member and substantially in the plane thereof, said guides being pivotally mounted at one end thereof on said shaft, film pressure shoes pivotally mounted in said guides intermediate the ends thereof, a pair of drums rotatably mounted on said member, a coil spring mounted in each of said drums and having one end secured to said drum and the free end thereof engaging one of said guides to independently move said guide toward a film sprocket, said drums being rotatable relative to said member to tension said springs, and means engaging said springs to lock the latter in adjusted position.

7. In a motion picture machine, the combination with an apertured support, of an intermittent film guide assembly comprising, a member detachably secured to said support, a shaft secured to one end of said member and projecting laterally from the opposite sides thereof, a pair of curved guides arranged on opposite sides of said member and loosely mounted at one end thereof on said shaft, each of said guides being formed with a longitudinally extending slot, a film pressure shoe positioned within said slot and pivotally mounted to said guide, spaced bearings on said member, drums rotatably mounted on said bearings, a coil spring positioned within each of said drums and having one end thereof secured to said drum and the other end engaging one of said guides to yieldably press the latter and its shoe toward a film sprocket, said drums being independently rotatable on said bearings to separately tension said springs, and means for locking said drums in adjusted position.

8. In a motion picture machine, a film guide assembly comprising, in combination, a support, a pair of independently movable guides pivotally mounted on said support and arranged to separately swing in substantially parallel planes toward or away from a film sprocket, film pressure shoes pivotally mounted on said guides and movable independently thereof, and separate means engaging each of said guides for yieldably pressing said shoes toward a film sprocket to hold said strip thereon.

9. In a motion picture machine, a film guide assembly comprising, in combination, a support, a pair of guides pivotally mounted on said support and arranged to separately and independently swing in substantially parallel planes toward or away from a film sprocket, film pressure shoes pivotally mounted on said guides and movable independently thereof, means for independently pressing each of said shoes toward said sprocket to hold said strip thereon, and separate means of adjusting said last mentioned means.

EDWIN F. TETZLAFF.